United States Patent [19]

Tateno et al.

[11] Patent Number: 5,443,054
[45] Date of Patent: Aug. 22, 1995

[54] SUPERCHARGING DEVICE FOR AN INTERNAL COMBUSTION ENGINE

[75] Inventors: Masao Tateno; Masao Teraoka, both of Tochigi, Japan

[73] Assignee: Tochi Fuji Sangyo Kabushiki, Japan

[21] Appl. No.: 218,672

[22] Filed: Mar. 28, 1994

[30] Foreign Application Priority Data

Mar. 29, 1993 [JP] Japan .................. 5-069652

[51] Int. Cl.$^6$ ................ F02B 39/04; F04D 29/04
[52] U.S. Cl. .................... 123/559.1; 415/122.1; 123/561
[58] Field of Search .............. 123/559.1; 415/111, 415/122.1

[56] References Cited

U.S. PATENT DOCUMENTS 3,174,680  3/1965  Young .................. 415/122.1
3,214,990  11/1965  Jekat .................... 415/122.1

FOREIGN PATENT DOCUMENTS

3-168329  7/1991  Japan .................. 123/559.1

*Primary Examiner*—Michael Koczo
*Attorney, Agent, or Firm*—Graham & James

[57] ABSTRACT

In a supercharging device for an internal combustion engine including an air compressor, a bearing holder, and a planetary gear type of speed increasing gear device with an internal gear, a pair of pinion gears, and a sun gear, a oil channel guiding lubricating oil to the plain bearings to form oil film damper is provided in the bearing holder. In the bearing holder located between the pinion gears, an oil guide means for directing the lubricating oil, splashed from the pinion gears toward the oil guides, in the direction of the sun gear, is provided. A thrust washer can be arranged between the plain bearings to receive the thrust force of the impeller shaft.

9 Claims, 7 Drawing Sheets

SUPERCHARGING DEVICE FOR AN INTERNAL COMBUSTION ENGINE

BACKGROUND OF THE INVENTION

The present invention relates to a supercharging device for an internal combustion engine for increasing the air-intake pressure of the internal combustion engine, and more particularly, to a supercharging device including a speed increasing gear device of a planetary gear type.

Figure 1:
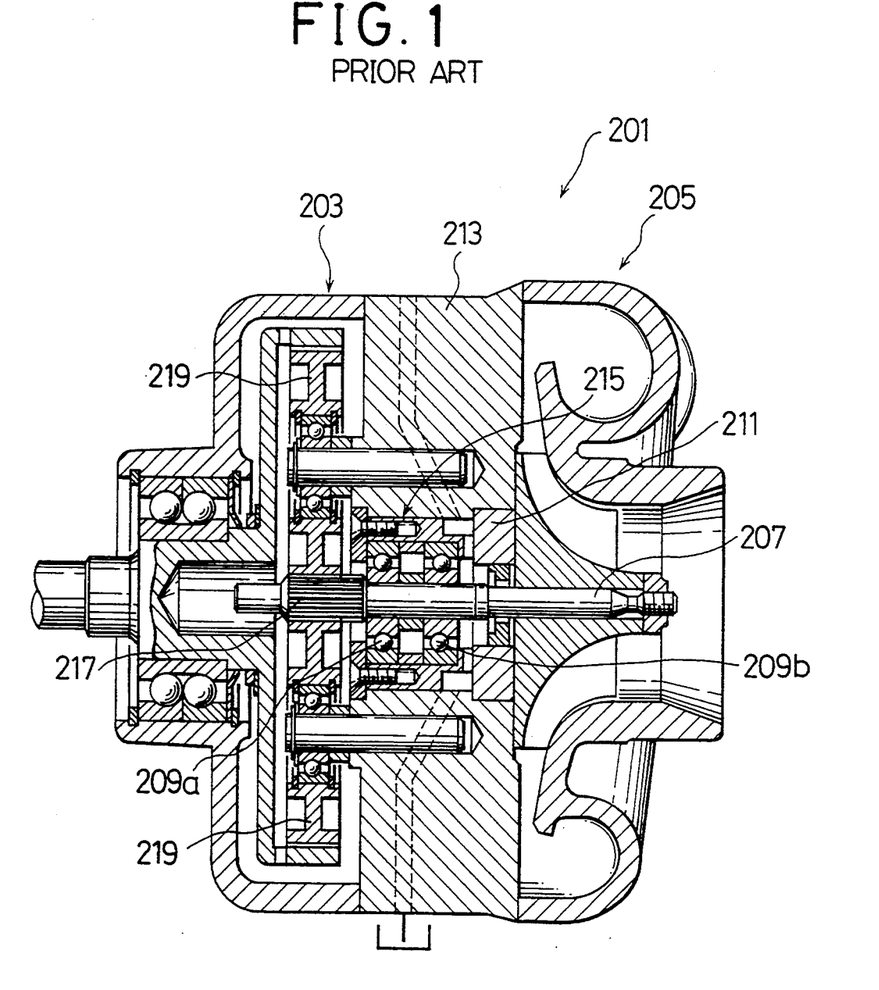
FIG. 1 is a sectional view of a conventional supercharging device.

Conventional mechanical driving mechanisms of superchargers for internal combustion engines are disclosed in the International Publications No. WO89/02521 (which corresponds to the official announcement Hei 3-500317 (1991) in Japan) and the International Publications No. WO89/02535 (which corresponds to the official announcement Hei 3-500319 (1991 in Japan). FIG. 1 illustrates the mechanical driving mechanism disclosed in the former publication. This supercharger 201 is constructed so as to increase the driving force of an engine by employing a planetary gear type of speed increasing gear device and to rotate an impeller shaft 207 of an air compressor.

In this supercharger 201, an oil film damper 215 is formed between a guide sleeve 211 and a casing 213 which support a pair of bearings 209a, 209b of the impeller shaft 207. The oil film damper 215 is necessary for absorbing the vibration of the impeller shaft 207 which rotates at high speeds. However, the impeller shaft 207 is suspended in this oil damper, thereby making the support of a sun gear 217 formed on the impeller shaft 207 unstable. Since the bearings 209a, 209b are angular contact types of ball-and-roller bearings and have larger radii compared to other types of bearings like a sliding bearing, the radius of the guide sleeve 211 must also be larger. Thus, the weight which the oil damper 215 supports becomes large, thereby requiring the oil film to be thick. Consequently, the ill-effects of the oil film damper 215 upon the support of the sun gear 217 is endorsed, thereby causing a bad engaging condition between the sun gear 217 and the pinion gears 219.

Furthermore, a pressure is previously added to the angular contact type of bearings 209a, 209b by the guide sleeve 211. Therefore, if the guide sleeve 211 swells due to the heat from the sun gear 217, etc., the added pressure is changed, thereby resulting in poor durability of the bearings 209a, 209b. Further, the lubricating oil is splashed from the pinion gears 219 toward the sun gear 217, thereby resulting in poor lubrication at times. If the lubrication of the sun gear 217 is inadequate, drying of the lubricating oil due to heat causes further poor lubrication condition.

Meanwhile, the thrust force of the impeller shaft 207 is received by the ball-and-roller bearings 209a, 209b. In order to prevent the synthetic vibration or damage due to synthetic vibration, it is necessary for the natural vibration frequency of the impeller shaft 207 to be sufficiently higher than the synthetic vibration frequency, thereby requiring as large a span between supporting points as possible. Further, the ball-and-roller bearings 209a, 209b have a larger amount of play in the radial direction thereof than those of a sliding bearing of the full-floating type in which oil film is employed. Accordingly, it is difficult in this type of mechanism to accurately widen the span. Further, if the ball-and roller bearings 209a, 209b, which have larger radii than those of a sliding bearing, are arranged in a relatively wide span, interference with the circumferential members occurs and the scale of the entire mechanism becomes large. In addition to these shortcomings, it is difficult for this mechanism to regulate synthetic vibration more effectively than a floating type of sliding bearing.

Figure 2:
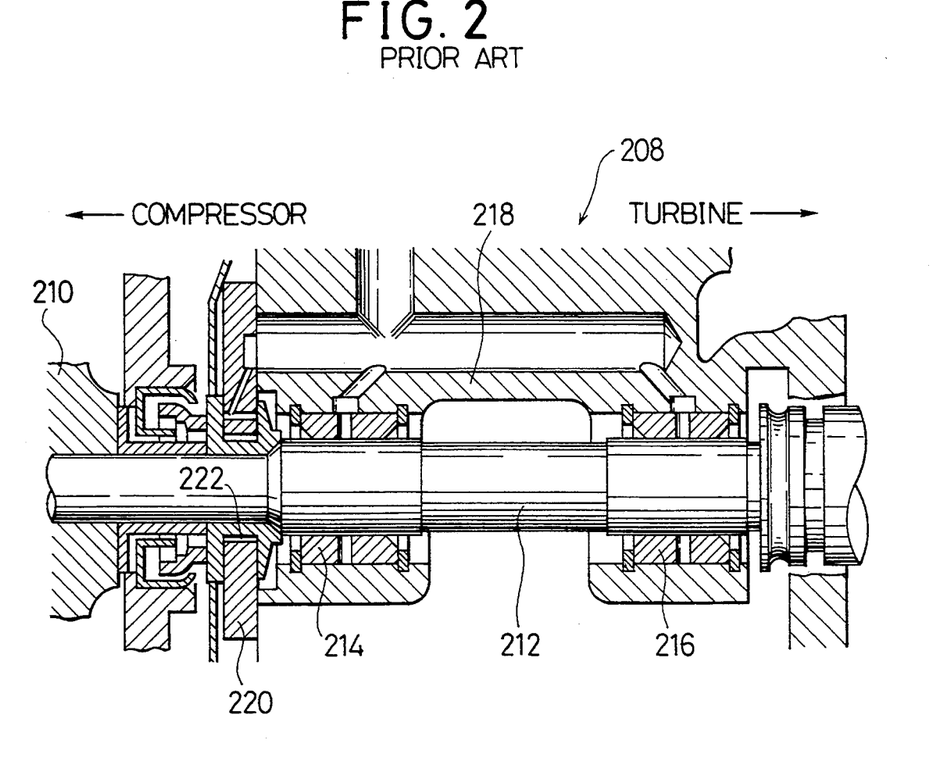
FIG. 2 is a sectional view of an another type of conventional supercharging device.

FIG. 2 illustrates a conventional type of supercharger 208 which has a similar configuration to that disclosed in the Japanese Utility Model application Laid Open No. 58-177529. In this supercharger which is for turbocharging, an impeller shaft 212 connecting a compressor impeller 210 with a turbine impeller is supported by a bearing holder 218 through a pair of sliding bearings 214, 216.

The sliding bearings 214, 216 are not employed to receive a thrust force as does the ball-and-roller bearings 209a, 209b shown in FIG. 1. Accordingly, a thrust washer 220 is arranged in a groove 222 provided close to the impeller shaft 212 and is supported by the bearing holder 218, to receive the thrust force. The bearing holder 218 is integrally formed so as to support the sliding bearings 214, 216 along the same line. Further, the thrust washer 220 is arranged outside of the sliding bearings 214, 216, specifically, on the compressor side. Therefore, the overhang of the distal part of the compressor impeller 210 over the sliding bearings 214, 216 has to be large, thereby causing vibrations easily and a narrow span between the sliding bearings 214, 216.

SUMMARY OF THE INVENTION

In view of the above, an object of the present invention is to solve the aforementioned problems in the prior art through the introduction of a supercharging device in which a sun gear in a planetary gear type of speed increasing gear device can be stably supported, a bearing supporting a sun gear can be operated in a good state, and the sun gear can be lubricated in a good condition.

Another object of the present invention is to provide a supercharging device in which a span between sliding bearings supporting an impeller shaft can be large and the overhang of an impeller over the sliding bearing is small.

The afore-mentioned objects of the present invention are accomplished through a supercharging device comprising: a casing; an air compressor with an impeller and an impeller shaft, said impeller shaft being rotatively driven by the driving force of the engine to pressurize the intake air to supply the air to the engine; a planetary gear type of speed increasing gear device with an internal gear, a pinion gear, and a sun gear, said internal gear transmitting the driving force of the engine, said pinion gear being rotatably supported on the casing, and said sun gear being formed on the impeller shaft of the air compressor; a pair of sliding bearings positioned at both sides of the sun gear in the axial direction thereof; a bearing holder with a first portion, a second portion, and a third portion along the axial direction of the impeller shaft, pressed into the casing and supporting the impeller shaft through the plain bearings, said second portion being located around the sun gear and the pinion gear in the radial direction thereof, said third portion extending from the second portion to one end of the impeller shaft on which the impeller is provided, said first portion extending from the second portion to the other end of the impeller shaft; and an oil channel provided in the bearing holder and guiding lubricating oil to the sliding bearings to form an oil film damper.

In a preferred embodiment, the second portion of the bearing holder is provided an oil guide means for directing the lubricating oil, splashed from the pinion gears toward the oil guides, in the direction of the sun gear.

In another preferred embodiment, the supercharger comprises a thrust washer which is arranged between the sliding bearings to receive the thrust force of the impeller shaft.

In the above-mentioned supercharging device, the air compressor is rotatively driven by the engine's driving force which is speed increased through the planetary gear type of speed increasing gear device.

The sun gear of the speed increasing gear device is supported by the bearing holder and is supported by the sliding bearings positioned at both sides of the sun gear in the axial direction thereof. In the sliding bearings, oil film damper is formed by the lubricating oil supplied from the oil channel provided in the bearing holder.

Differing from the conventional example shown in FIG. 1, there is no heavy weight suspended over the oil film dampers, therefore it is possible to use a thin oil film. Accordingly, the effect of the oil film damper over the support of the sun gear becomes small, whereby the engagement of the sun gear with the pinion gears is good.

Further, because the sliding bearings are used, previously added pressure to the bearings becomes unnecessary, and the thermal expansion of the bearing holder is shut out by the oil film dampers, whereby the sliding bearings are normally maintained in a good operating state.

Moreover, since the second portion of the bearing holder is provided an oil guide means, to direct the lubricating oil, splashed from the pinion gears toward the oil guides, the lubrication of the sun gear is improved so that generation of heat by engagement with the pinion gears is prevented.

Moreover, when the bearing holder is supported in an overhanging manner on the opposite side of the impeller, the thrust washer is positioned between the sliding bearings. In this way, the overhang of the impeller becomes small and it is possible to widen the span of the sliding bearings. Accordingly, the natural vibration frequency of the impeller shaft can be sufficiently higher than the synthetic vibration frequency, thereby preventing the synthetic vibration of the impeller shaft or damage due to the synthetic vibration. In addition, when the retaining ring is used in the bearing holder as the retaining ring for the thrust washer, the number of parts can be reduced.

DETAILED DESCRIPTION OF THE PREFERRED EMBODIMENTS

Other features of this invention will become apparent in the course of the following description of exemplary embodiments which are given for illustration of the invention and are not intended to be limiting thereof.

FIRST EMBODIMENT

Figure 3:
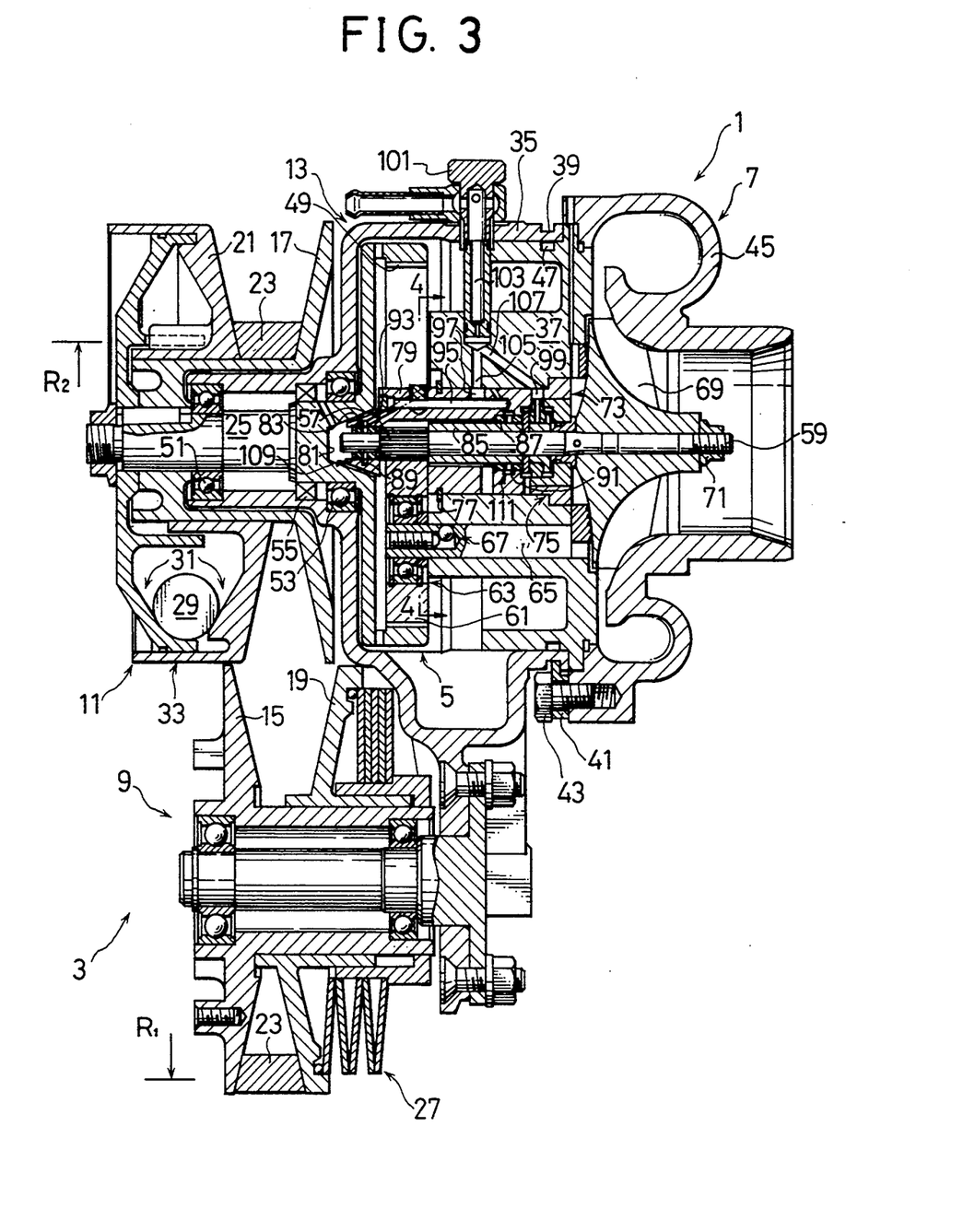
FIG. 3 is a sectional view of a supercharging device for an internal combustion engine according to a first embodiment of the present invention.

An explanation of a first embodiment of the present invention will now be given with reference to FIG. 3 to FIG. 5. FIG. 3 shows a supercharger 1 of this embodiment. The below-described right and left sides correspond to the right and left sides in FIGS. 3 and 5. Further, like reference numerals designate identical or corresponding parts throughout the several views.

As shown in FIG. 3, the supercharger 1 comprises a belt-driven nonstep transmission 3, a planetary gear type of speed increasing gear device 5, and a centrifugal-type air compressor 7.

The belt-driven nonstep transmission 3 includes a drive pulley 9 and a driven pulley 11. The drive pulley 9 and the driven pulley 11 are positioned to rotate freely with respect to a casing 13, and includes movable flanges 19, 21 which can move in the axial direction with respect to a fixed flange 15 and a fixed flange 17 respectively, and are connected through a belt 23 installed between these flanges. The drive pulley 9 is rotatively driven by the drive force from an engine crank shaft, while the driven pulley 11 transmits drive force to the speed increasing gear device 5 via a connecting shaft 25 connected to the fixed flange 17.

The movable flange 19 is pressed toward the fixed flange 15 side by means of a disc spring 27 on the drive pulley 9 to provide tension on the belt 23. Also, a centrifugal cam 33 made up of a flyweight 29 and a pair of cams 31, 31 is formed on the drive pulley 11. When the RPM of the engine increases, the movable flange 21 is pressed toward the fixed flange 17 side by means of the cam thrust force of the centrifugal cam 33 so that a pulley pitch diameter R2 of the driven pulley 11 increases, and a pulley pitch diameter R1 of the drive pulley 9 decreases, from the belt tension so that the speed increase ratio of the nonstep transmission 3 drops. In addition, when the RPM of the engine is reduced, the cam thrust force of the centrifugal cam 33 is also reduced, the pulley pitch diameter R1 increases and the pulley pitch diameter R2 decreases from the energization of the disc spring 27 so that the speed increase ratio increases.

As a result, in the belt-driven nonstep transmission 3 the drive force of the engine is transmitted to the speed increasing gear device 5, restricting the width of variation of the RPM of the engine to a small value.

The casing 13 comprises a body 35 and a flange 37. The flange 37 is secured to the body 35 together with a compressor housing 45 of the air compressor 7 by means of a connecting member 41, which engages a peripheral groove in the body 35, and a bolt 43. An O-ring 47 is positioned between the body 35 and the flange 37.

An internal gear 49 of the speed increasing gear device 5 is integrally formed at the right end of the connecting shaft 25. The connecting shaft 25 is removably supported on the body 35 through a pair of bearings 51, 53. A seal 55 is positioned between the body 35 and the connecting shaft 25 at the left side of the bearing 53. A sun gear 57 is formed on an impeller shaft 59 of the air compressor 7. Two pinion gears 61 are utilized, as shown in FIG. 4. These pinion gears 61 are removably supported on a pinion shaft 65 through a bearing 63. The pinion shaft 65 is supported on the flange 37 and a means 67 for preventing the pinion shaft from falling off is provided, made up of a ball and a screw. The speed increasing gear device 5 is thus formed, and the speed of the drive force of the engine input to the connecting shaft 25 is increased by means of the speed increasing gear device 5, so that the impeller shaft 59 is caused to rotate.

An impeller 69 of the air compressor 7 is pressed into the right end of the impeller shaft 59 and is locked by a nut 71. When the impeller 69 is rotatably driven through the impeller shaft 59, the air compressor 7 pressurizes the intake air and supplies this air to the engine.

The right side section of a bearing holder 73 is pressed into the flange 37 of the casing 13. The bearing holder 73 is positioned on the flange 37 by means of a stopper section 75 and a retaining ring 77.

Figure 4:
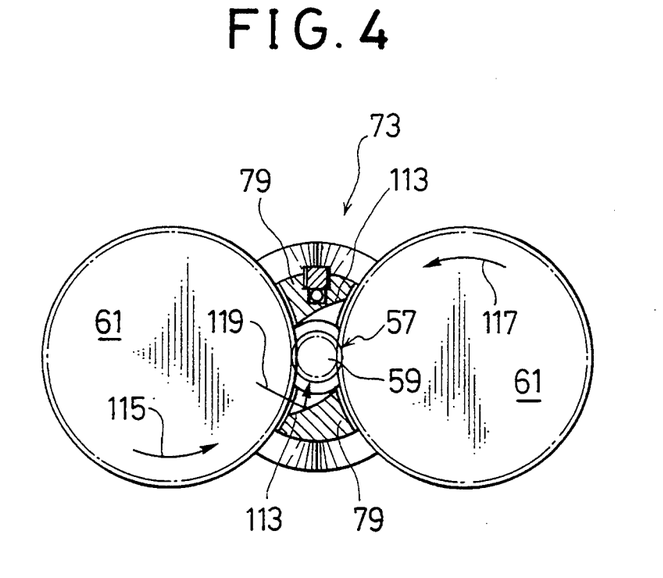
FIG. 4 is a sectional view taken substantially along the lines 4—4 of FIG. 3.
Figure 5:
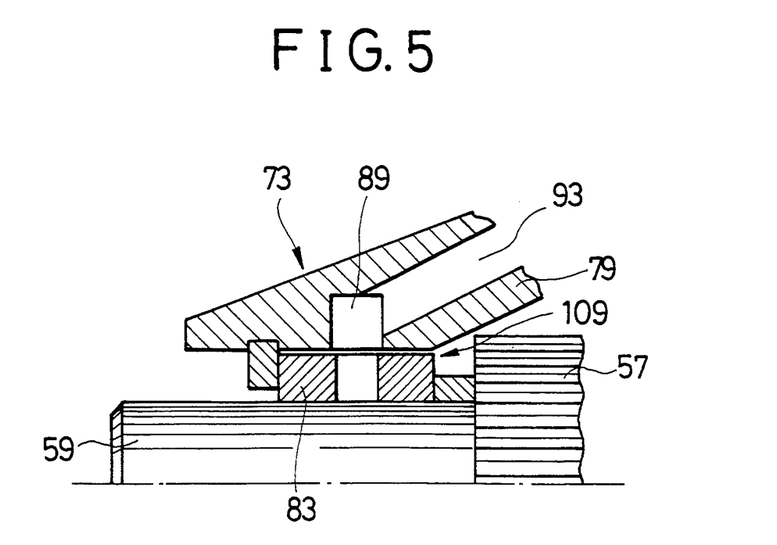
FIG. 5 is an enlarged sectional fragmentary view of the periphery of a sliding bearing shown in FIG. 3.

A connector section 79 positioned between the pinion gears 61 is provided on the left end of the bearing holder 73, as shown in FIG. 4. The bearing holder 73 extends as far as the left side of the sun gear 57 through the connector section 79. An indented section 81 is provided on the connecting shaft 25 to prevent interference between the connecting shaft 25 and the left end sections of the bearing holder 73 and the impeller shaft 59.

The bearing holder 73 removably supports the impeller shaft 59 through a sliding bearing 83 on the left side of the sun gear 57 and through a flange 85 and a sliding bearing 87 on the right side of the sun gear 57. Peripheral grooves 89, 91 which are formed in the outer periphery of the sliding bearings 83, 87, and oil channels 93, 95, 97, 99, and the like are provided in the bearing holder 73. Also, an oil pump is connected to an oil plug 101 installed in the body 35. Lubricating oil from the oil pump is supplied to the sliding bearings 83, 87 through a nozzle 103, oil channels 105, 107 provided in the flange 37, and the oil channels 93, 95, 97, 99 provided in the bearing holder 73, to form oil film dampers 109, 111. FIG. 5 is an enlarged view of the periphery of the sliding bearing 83.

Vibration on the impeller shaft 59 side is absorbed by the oil film dampers 109, 111 to prevent damage to the impeller 69. Differing from the conventional example shown in FIG. 1 wherein the weight of a large diameter, heavy guide sleeve, and that of the angular contact types of bearings hangs over the oil film damper, there is no heavy weight suspended over the oil film dampers 109, 111 formed on the sliding bearings 83, 87, therefore it is possible to use a thin oil film. Accordingly, the support of the impeller shaft 59 is stabilized, and the engagement of the sun gear 57 with the pinion gears 61 is good, so that vibration and noise are reduced and the durability is improved.

Because the sliding bearings 83, 87 are used, previously added pressure to the bearings becomes unnecessary, and the thermal expansion of the bearing holder 73 is shut out by the oil film dampers 109, 111, whereby the sliding bearings 83, 87 are normally maintained in a good operating state.

Also, a pair of oil guides 113, specifically notches, are formed in the pair of connecting sections 79 of the bearing holder 73, shown as a shaded area in FIG. 4. The oil guides 113 have guide faces which face the sun gear 57. Lubricating oil splashed from the pinion gears 61, which rotate in the direction of the arrows 115, 117, respectively, to the oil guides 113 is directed in the direction of the sun gear 57 as indicated by the arrow 119. In this manner, the lubrication of the sun gear 57 is improved so that generation of heat by engagement with the pinion gears 61 is prevented.

SECOND EMBODIMENT

A second embodiment of the present invention will now be explained with reference to FIG. 6 to FIG. 10. The below-described right and left sides correspond to the right and left sides in FIGS. 6 and 9. Members and the like which are not assigned reference numerals are not shown in the drawings. In addition, members which are identical to members which appear in the first embodiment have been assigned the same reference numerals. Further explanation is therefore omitted.

Figure 7:
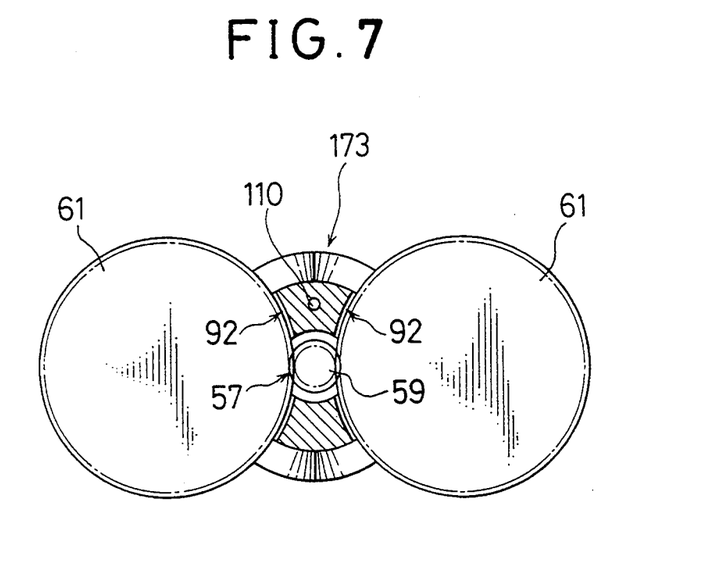
FIG. 7 is a sectional view taken substantially along the lines 7—7 of FIG. 6.

The speed increasing gear device 5' includes an internal gear 49 formed integrally with an input shaft 25, a pinion gear 61, and a sun gear 57 formed on an impeller shaft 59. In this speed increasing gear device 5', the speed of the rotation of the driven pulley 11 is increased to drive the impeller shaft 59. The two pinion gears 61 are positioned in the peripheral direction as shown in FIG. 7, and are removably supported on the pinion shaft 65 through the bearing 54 respectively, while the pinion shaft 65 is removably supported on the flange 137.

Figure 6:
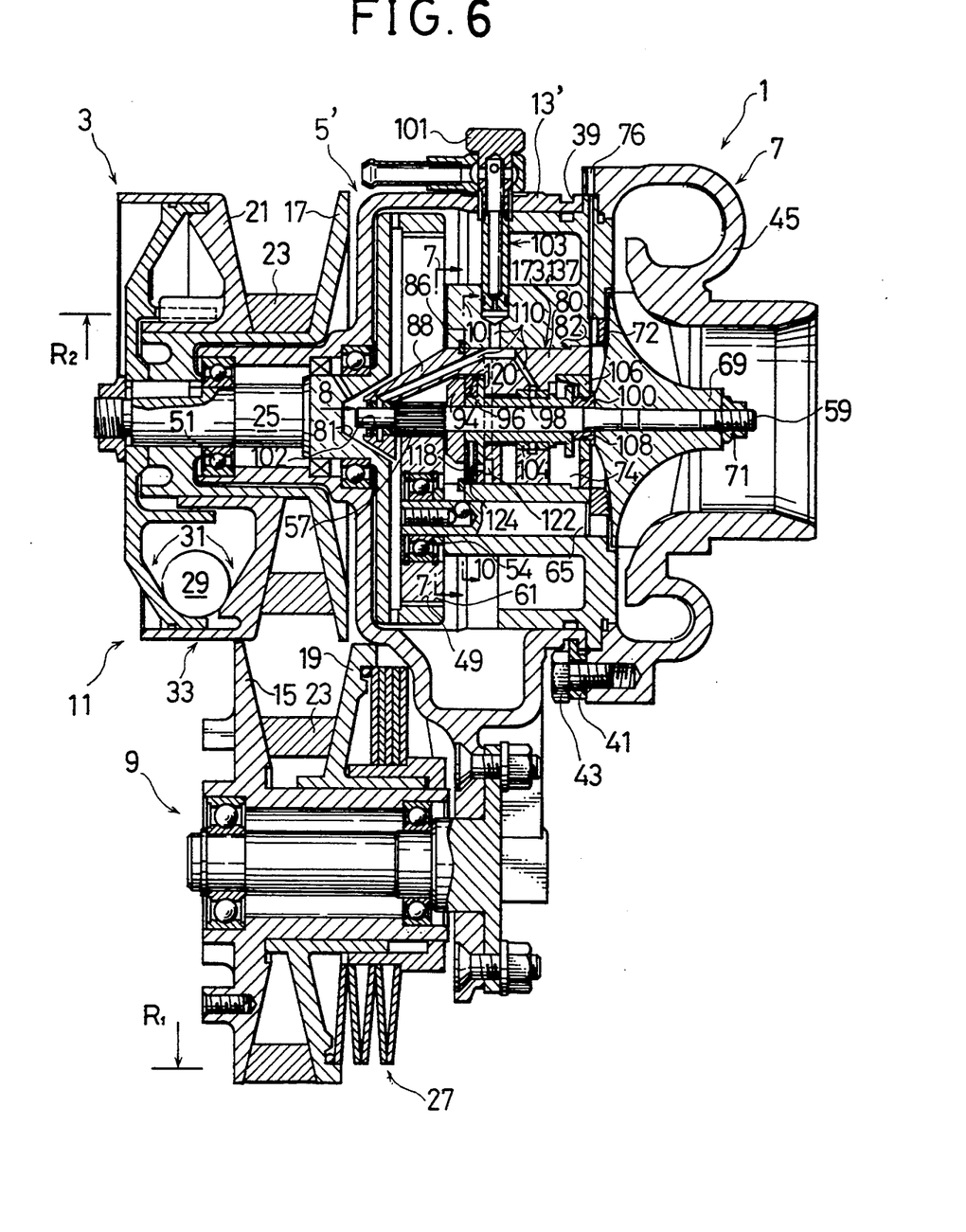
FIG. 6 is a sectional view of a supercharging device according to a second embodiment of the present invention.

The impeller 69 is secured to the right end of the impeller shaft 59 by the nut 71. The compressor housing 45 is secured to the casing 13' together with the flange 137 by means of the bolt 43 and the connecting member 41 which engages a peripheral groove 39 in the casing 13'. The centrifugal-type air compressor 7 is formed in this manner. When the impeller 69 is rotatably driven, the air compressor 7 pressurizes the intake air and supplies this air to the engine.

A labyrinth seal 72 is positioned on the left side of the impeller 69 to form a space 74. When a throttle valve positioned in the intake air input channel upstream from the impeller 69 is closed and a negative pressure is created on the right side of the impeller 69, the space 74 is opened to atmosphere through a control valve and an airflow channel 76. In this manner the space 74 is normally held at a positive pressure.

Figure 8:
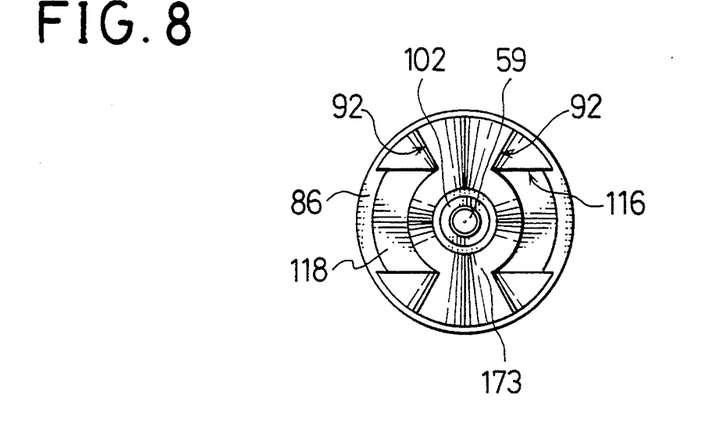
FIG. 8 is a fragmentary view taken in the direction of the arrow 8 of FIG. 6.
Figure 9:
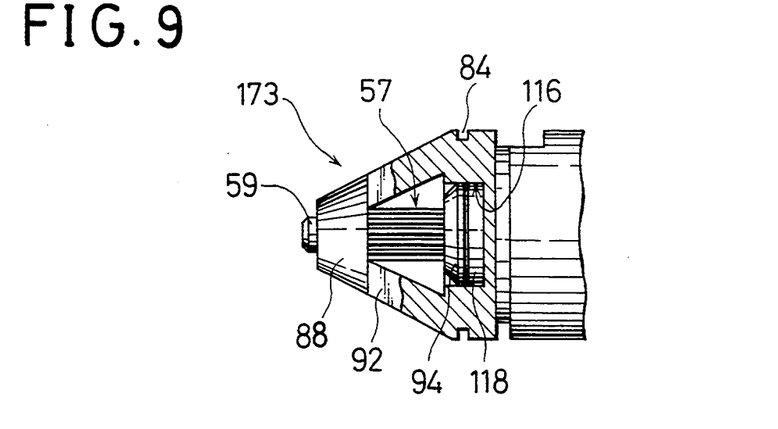
FIG. 9 is a fragmentary sectional view of a bearing holder shown in FIG. 6.

A bearing holder 173 is supported on a flange 137 through a support section 80 which is a part of the bearing holder 173 and is positioned in the axial direction by means of a stepped section 82, provided in the flange 137, and a retaining ring 86 mounted in a groove 84 (FIG. 9) of the bearing holder 173. An overhang section 88 is formed on the left side of the bearing holder 173. The overhang section 88 penetrates an indented section 81 of the input shaft 25. As shown in FIGS. 7, 8, and 9, a plurality of notches 92 for preventing interference with the pinion gears 61 are provided in the bearing holder 173.

From the left, rings 94, 96, a spacer 98, and a bushing 100 are interposed between the sun gear 57 and the impeller 69 on the impeller shaft 59. In addition, sliding bearings 102, 104 are positioned respectively on the outer periphery of the impeller shaft 59 on the left side of the sun gear 57 and the spacer 98, and the impeller shaft 59 is removably supported with respect to the bearing holder 73. Also, a seal 106 and a piston ring 108 are positioned between the bearing holder 173 and the bushing 100, to prevent leakage of oil from the side of the casing 13'. Even when a negative pressure is produced at the intake side of the impeller 69, the space 74 is normally held at a positive pressure in the above manner, therefore leakage of oil from the seal section 106 is effectively prevented.

Pressurized oil from the oil pump is supplied to the sliding bearings 102, 104 via a formed oil channel 110, the nozzle 103, and the oil plug 101, passing through a bearing holder 173 and the flange 137. By means of an oil film formed on the inner and outer periphery of the sliding bearings 102, 104, the impeller shaft 59 is removably supported in a full-floating state, thus absorbing any vibration.

Figure 10:
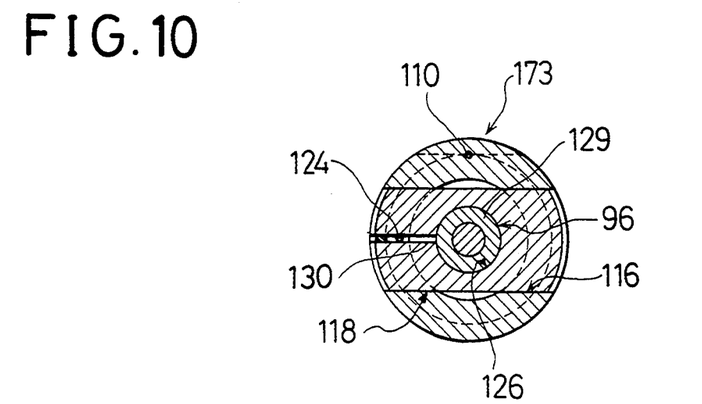
FIG. 10 is a sectional view taken substantially along the lines 10—10 of FIG. 6.

As shown in FIGS. 8, 9, and 10, a groove 116 is provided in the radial direction in the overhang section 88 of the bearing holder 173. A thrust washer 118 is installed in the groove 116, and the thrust washer 118 is engaged in a groove 120 (FIG. 6) between the rings 94, 96. The thrust washer 118 is positioned in the axial direction by means of the retaining ring 86 on the bearing holder 173. The rings 94, 96 are positioned in the left side thereof by means of the sun gear 57, and in the right side thereof by means of the spacer 98, the bush 100, the impeller 69, and the nut 71, so that the impeller shaft 59 is positioned in the axial direction with respect to the casing 13 via the thrust washer 118 and the bearing holder 173.

The oil in the oil channel 110 is supplied through oil channels 122, 124, 130 provided in the bearing holder 173 and the thrust washer 118, and this oil lubricates a sliding section between the thrust washer 118 and the rings 94, 96.

As shown in FIGS. 6 and 10, the thrust washer 118 is provided with a circular hole 126, which can be fitted into the outer periphery of a boss section 129, and an oil channel 130, which extends from the circular hole 126 in the radial direction of the bearing holder 173. Therefore, when under assembling, the thrust washer 118 is fitted into the groove 116 in the condition in which the thrust washer 118 is interposed between the rings 94, 96 while the circular hole 126 of the thrust washer 118 is fitted into the outer periphery of the boss section 129. Subsequently the impeller shaft 59 is fitted into the inner periphery of the rings 94, 96 from the left direction.

The supercharger 1 is formed in this manner.

As outlined in the foregoing explanation, because the bearing holder 173 is supported in an overhanging manner on the opposite side of the impeller 69, the thrust washer 118 is positioned between the sliding bearings 102, 104, therefore it is possible to widen the span of the sliding bearings 102, 104. Accordingly, the natural vibration frequency of the impeller shaft 59 can be sufficiently higher than the synthetic vibration frequency, thereby preventing the synthetic vibration of the impeller shaft 59 or damage due to the synthetic vibration. In addition, this differs from the conventional example, inasmuch as the thrust washer 118 is not between the sliding bearing 104 and the impeller 69, therefore the overhang of the impeller 69 becomes small and the head vibration is reduced. In addition, the retaining ring 86 of the bearing holder 173 is used as the retaining ring for the thrust washer 118, therefore the number of parts can be reduced.

What is claimed is:

1. A supercharging device for an internal combustion engine comprising:

a casing;

an air compressor with an impeller and an impeller shaft, said impeller shaft being rotatively driven by the driving force of the engine to pressurize the intake air to supply the air to the engine;

a planetary gear type of speed increasing gear device with an internal gear, a pinion gear and a sun gear, said internal gear transmitting the driving force of the engine, said pinion gear being rotatably supported on the casing, and said sun gear being formed on the impeller shaft of the air compressor;

a pair of sliding bearings positioned at both sides of the sun gear in the axial direction thereof;

a bearing holder with a first portion, a second portion, and a third portion along the axial direction of the impeller shaft, pressed into the casing and supporting the impeller shaft through the sliding bearings, said second portion being located around the sun gear and the pinion gear in the radial direction thereof, said third portion extending from the second portion to one end of the impeller shaft on which the impeller is provided; said first portion extending from the second portion to the other end of the impeller shaft;

an oil channel provided in the bearing holder and guiding lubricating oil to the sliding bearings to form an oil film damper;

a thrust washer arranged between the sliding bearings to receive the thrust force of the impeller shaft; and retaining means positioning the bearing holder and the thrust washer on the casing in the axial direction of the impeller shaft.

2. A supercharging device according to claim 1, wherein the second portion of the bearing holder is provided with an oil guide means for directing the lubricating oil, splashed from the pinion gear toward the oil guides, in the direction of the sun gear.

3. A supercharging device according to claim 2, wherein said oil guide means comprise a notch which has a guide fact facing the sun gear.

4. A supercharging device according to claim 1, wherein said retaining means comprises a ring which is mounted in a groove provided on the periphery of the bearing holder.

5. A supercharging device for an internal combustion engine comprising:

a casing;

an air compressor with an impeller and an impeller shaft, said impeller shaft being rotatably driven by the driving force of the engine to pressurize the intake air to supply the air to the engine;

a planetary gear type of speed increasing gear device with an internal gear, a pinion gear, and a sun gear, said internal gear transmitting the driving force of the engine, said pinion gear being rotatably supported on the casing, and said sun gear being formed on the impeller shaft of the air compressor;

a pair of sliding bearings positioned at both sides of the sun gear in the axial direction thereof;

a bearing holder with a first portion, a second portion, and a third portion along the axial direction of the impeller shaft, pressed into the casing and supporting the impeller shaft through the sliding surface bearing, said second portion being located around the sun gear and the pinion gear in the radial direction thereof, said third portion extending from the second portion to one end of the impeller shaft on which the impeller is provided, said first portion extending from the second portion to the other end of the impeller shaft;

an oil channel provided in the bearing holder and guiding lubricating oil to the sliding bearings to form an oil film damper;

a thrust washer arranged between the sliding bearings to receive the thrust force of the impeller shaft; and ring means arranged along the impeller shaft and having a groove portion, said groove portion engaging the thrust washer.

6. A supercharging device according to claim 5, wherein said ring means comprises a first boss portion and a second boss portion, said first boss portion having a smaller radius than that of the second boss portion;

said thrust washer comprises a circular hole, said circular hole being fitted into the outer periphery of the first boss section; and said third portion of the bearing holder comprises a washer groove into which the thrust washer is fitted, so that the thrust washer can be fitted into the washer groove.

7. A supercharging device according to claim 5, wherein said oil channel extends to the thrust washer to guide lubricating oil thereto.

8. A supercharging device according to claim 7, wherein said thrust washer has an oil channel so that the oil in the oil channel lubricates a sliding section between the thrust washer and the ring means.

9. A supercharging device for an internal combustion engine comprising:

a casing;

an air compressor with an impeller and an impeller shaft, said impeller shaft being rotatably driven by the driving force of the engine to pressurize the intake air to supply the air to the engine;

a planetary gear type of speed increasing gear device with an internal gear, a plurality of pinion gears, and a sun gear, said internal gear transmitting the driving force of the engine, said pinion gear being rotatably supported on the casing, and said sun gear being formed on the impeller shaft of the air compressor;

a pair of sliding bearings positioned at both sides of the sun gear in the axial direction thereof;

a bearing holder with a first portion, a second portion, and a third portion along the axial direction of the impeller shaft, pressed into the casing and supporting the impeller shaft through the sliding bearings, said second portion being surrounded by the sun gear, the internal gear and the pinion gears and being located therebetween, said third portion extending from the second portion to one end of the impeller shaft on which the impeller is provided and including an inner periphery and an outer periphery, said inner periphery of the third portion rotatably supporting the impeller shaft through the sliding bearing, said outer periphery being pressed into the casing, said first portion extending from the second portion to the other end of the impeller shaft and including an inner periphery which rotatably supports the impeller shaft through the sliding bearing; and an oil channel provided in the bearing holder and guiding lubricating oil to the sliding bearing located in the first portion through the outer periphery of the third portion and the second portion and to the sliding bearing located in the third portion through the outer and inner peripheries of the third portion, thereby forming oil film dampers.

* * * * *